May 17, 1955 — L. A. PALEY — 2,708,560
VIBRATION AND SHOCK MOUNT
Filed Nov. 1, 1948
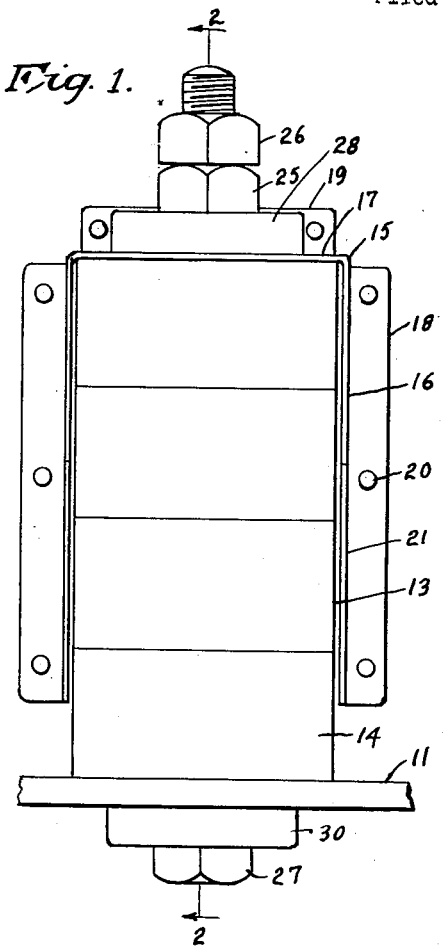
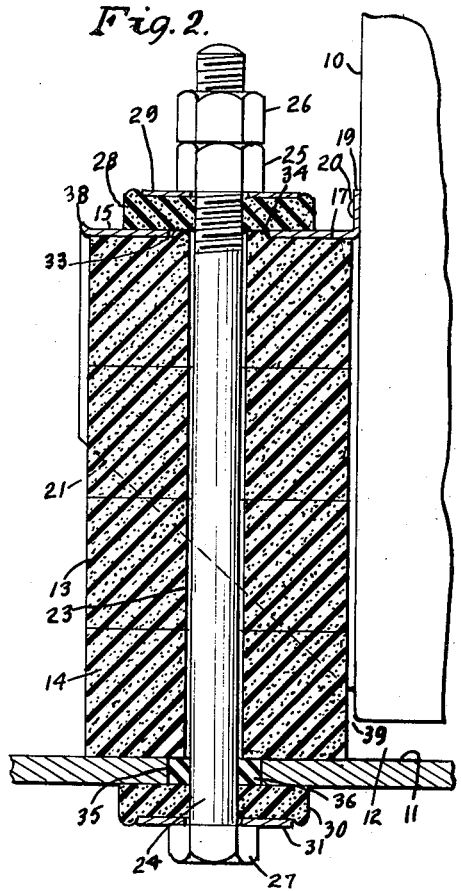
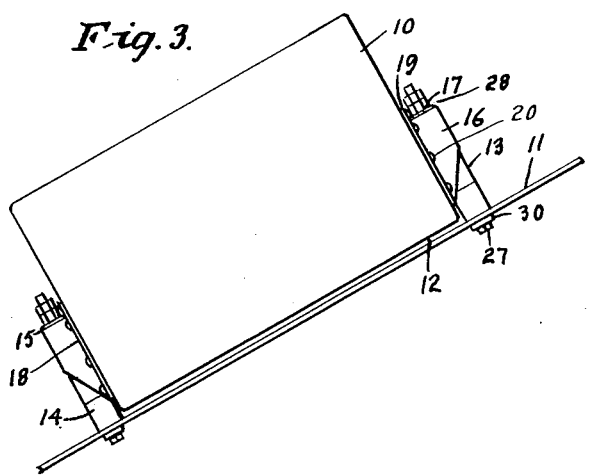
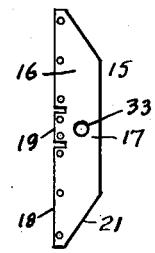
INVENTOR.
Lewis A. Paley United States Patent Office 2,708,560
Patented May 17, 1955

2,708,560

VIBRATION AND SHOCK MOUNT

Lewis A. Paley, Aurora, Ill.

Application November 1, 1948, Serial No. 57,695

6 Claims. (Cl. 248—204)

This invention relates to shock and vibration mounts for isolating instruments and the like on surfaces which are subject to vibration and shock.

The invention further relates to vibration mounts for isolating vibrating machinery from floors, etc.

On battleships equipped with radar, navigation instruments, etc., the supporting surfaces for the instrument boxes are constantly changing their angular position due to the pitch and roll of the ship. The supporting surfaces are also vibrating due to the vibration of the engines and may be shocked due to the firing of a broadside. The same conditions exist on tanks and other vehicles. With airplanes, a low frequency vibration exists when the plane is taxying along the ground which causes instrument panels to "gallop" at the resonant frequency of the mounts commonly used. When the plane is banking, climbing, diving or flying up-side-down the supporting surfaces for the instruments are constantly changing angle. Many of the vibration and shock mounts commonly used will make a metal-to-metal contact as the angle of support changes from the horizontal, with the result that the instruments are often broken due to the high amplitude and dangerous vibrations set up. Other commercial mounts of ordinary rubber will fracture at the low temperatures commonly experienced when flying at high altitudes. Most commercial mounts have a resonant frequency at 5 to 10 cycles/sec., where they not only do not isolate from the vibration, but actually "gallop" at a high amplitude, as much as 1¼", with destructive effects on the instruments which are supposed to be benefited by the mounts. Other mounts show a resonant frequency at 30–35 cycles/sec. and again at 50–55 cycles/sec. Many of the shock mounts used do not properly protect delicate instruments so that breakage occurs.

An object of the invention, therefore, is to provide a vibration and shock mount which will operate perfectly without resonance at all angles of inclination.

Another object of the invention is to provide a vibration mount which will operate without metal-to-metal contact at all angles of inclination.

Another object of the invention is to provide a vibration and shock mount which will operate without resonance at all frequencies when the supporting surface is horizontal.

A further object of the invention is to provide a vibration and shock mount which will isolate when a plane is flying up-side-down.

A still further object of the invention is to provide a vibration mount which will isolate a vibrating machine from a floor without resonance; also to improve vibration and shock mounts in other respects hereinafter specified and claimed.

Reference is to be had to the accompanying drawing forming a part of this specification in which Fig. 1 is a front elevation of the vibration and shock mount, Fig. 2 is a central sectional elevation through the mount taken on line 2—2 of Fig. 1, Fig. 3 is an elevation of a unit or instrument box operating at an angle, and Fig. 4 is a sheet metal blank for forming the mount bracket.

Referring to the drawing by numerals, an instrument box or unit 10 may be supported in spaced relation to a table or surface 11, which may be in the form of a metal plate. The supporting means or vibration and shock mount of the invention, is preferably arranged one at each of the four corners of the box 10, or at four or more points along a vibrating machine. The mounts are so designed that the bottom of box 10 is at a clearance distance 12 at all times from surface 11.

The mount comprises a column 13 of sponge rubber or synthetic rubber, such as Neoprene, which may be of individual biscuits 14 or may be molded all in one piece. The top of column 13 is enclosed in a U-shaped bracket 15, having down-standing legs 16 connected at the top by a column seat 17. The bracket 15 is provided with side flanges 18 and top flange 19 which are attached to the vertical wall of box 10 by welding, or by rivets, screws, or bolts 20. The legs 16 may be provided with a sloping edge 21 or may be rectangular in form if desired. A hole 23 passes centrally through the column 13 and a bolt 24 extends through said hole, being provided at the top with a nut 25 and locknut 26, and at the bottom with a head 27. A sponge rubber washer 28 and metal washer 29, separate the nut 25 from the seat 17, and a sponge rubber washer 30 and metal washer 31 separate the head 27 from the plate 11. A large hole 33 is formed in the seat 17 and the sponge rubber tends to squeeze upwardly to form a projecting ring 34 which prevents metal-to-metal contact between bolt 24 and seat 17. A large hole 35 is provided in the plate 11 and a rubber washer 36 encloses the bolt 24 in said hole so as to prevent metal-to-metal contact between bolt 24 and plate 11. The outer edges of legs 16 are preferably provided with curved flanges 38 so as not to cut the rubber.

When the plate 11 is horizontal, a narrow space 39 normally exists between the box 10 and column 13. When the supporting plate 11 extends at an angle as in Fig. 3, the box 10 swings to the left and presses directly against the column of rubber 13, the latter serving as a resilient stop to limit the swinging of the box. Where the box 10 contacts the rubber column 13, a snubbing action takes place, which is greater the greater the angle of inclination, so as to effectively check any tendency of the box to "gallop" at resonance. When a plane is flying up-side-down, the box 10 will be supported on sponge rubber washers 30 which absorb the vibration. These washers 30 may be made thicker if desired if such up-side-down flying is to be practiced. It will be observed from Fig. 3 that the box 10 is supported near a plane passing through its center of gravity due to the length of columns 13, which is beneficial in isolation for vibration and shock. Nuts 25 and 26 may be tightened to any desired extent to provide a snubbing action due to the effect of washers 28 and 30. The nuts 25 and 26 may also be adjusted to place any desired preload on the column 13 to improve isolation results.

The length of the columns 13 have much to do with the surprising result that the mount isolates perfectly at the horizontal, at all angles to the horizontal and at all cycles from 0–55 cycles/sec. If a pencil is attached to the box 10 and a paper is drawn across the pencil while plate 11 is vibrating, a straight line without a trace of resonance, will be produced under all conditions of angle and frequency of vibration. Good isolation will be obtained when flying up-side-down depending on the thickness of rubber washers 30. The bracket 15 is simple to form of sheet metal by conventional die operations, the blank being shown in Fig. 4. The bracket may also be made by casting. Other resilient materials may be used for columns 13, such as cork, felt, machine rubber, or any material which is resilient in all directions.

The mounts may be used for supporting a vibrating machine. If desired, the mounts may be arranged within the box 10 and extending through the bottom of the box in order to save external space.

I would state in conclusion, that while the examples illustrated constitute practical embodiments of my invention, I do not wish to be limited to specific details, since manifestly, the same may be considerably varied without departing from the spirit of the invention as defined in the appended claims.

Having thus described my invention, I claim as new and desire to secure by Letters Patent:

1. In a vibration mount, a column of non-metallic material resilient in all directions, a metallic member supporting said column and being subject to vibration, a metallic unit positioned closely adjacent the side of said column for lateral contact with said column, a metallic bracket on said unit for resiliently supporting said unit on top of said column, said bracket being connected to said unit near a plane passing substantially horizontally through the center of gravity of said unit, a yieldingly held connecting bolt between said bracket and member and passing through said column, said connecting bolt being free to pivot about the lower end thereof so as to permit said unit to press laterally against the side of said column as the angle of said member varies from the horizontal so as to resiliently support said unit and act as a snubber, and non-metallic resilient material isolating said bolt from said member and said bracket, said unit being free of metal-to-metal contact with said metallic supporting member at all angles of inclination.

2. In a vibration mount, a metallic member subject to vibration, a metallic unit positioned in spaced relation above said member, a plurality of columns of non-metallic resilient material supporting said unit on said member, a U-shaped metal bracket on said unit supported by each of said columns, a bolt passing through each of said columns and brackets, the lower end of each bolt being pivotally and yieldingly mounted relative to said member, and non-metallic resilient material isolating said bolts from said brackets, said unit bearing laterally against said columns when said member is inclined to the horizontal and being free of metal-to-metal contact between said member and said unit regardless of the angle of inclination of said member.

3. A vibration mount as described in claim 2 characterized by flanges on said brackets for laterally engaging the sides of said column as said member is inclined to the horizontal, said columns extending substantially normal to a plane passing horizontally through the center of gravity of said unit and having resiliency to prevent resonant frequency of vibration of said unit.

4. In a vibration mount, a metallic support member subject to vibration, a plurality of columns of non-metallic material resilient in all directions supported by said member, a metallic unit, a metal bracket on said unit adjacent each column for yieldingly supporting said unit on said column, a tie member for each column being pivotally mounted on said support member to resiliently limit lateral movement of said unit when said member is inclined to the horizontal, and non-metallic resilient material separating said tie members from said bracket and support member aiding in preventing metal-to-metal contact between said member and said unit regardless of the angle of inclination of said support member.

5. In a vibration mount suitable for supporting a unit in an up-side-down position, a metallic supporting member subject to vibration, a plurality of support columns of sponge rubber supported by said member, a metallic unit resiliently supported on said columns, a bolt passing through each of said columns for providing lateral stiffness for each column, a bracket associated with each column and bolt, said bolts being pivotally mounted at each end relative to said bracket and member to permit said unit to press laterally against a column when said member is inclined to the horizontal, and a non-metallic resilient washer mounted between said bracket and said bolt for resiliently supporting said unit when said member and unit are inverted, the associated parts being arranged to support said unit without resonant frequency of vibration and metal-to-metal contact.

6. In a vibration mount, a column of sponge rubber, a metallic member supporting said column and being subject to vibration, a metallic unit positioned closely adjacent the side of said column for lateral contact with said column, a metallic bracket on said unit for resiliently supporting said unit on top of said column, said bracket being connected to said unit near a plane passing substantially horizontally through the center of gravity of said unit, a bolt passing through said support member, column and bracket so as to be pivotally mounted relative to said bracket and support member to permit said unit to press laterally against the side of said column as the angle of the support member varies from the horizontal and to resiliently support said unit and act as a snubber, said bracket and support member each having a hole larger in diameter than said bolt, and non-metallic resilient material in said holes around said bolt to isolate said bolt from said bracket and support member, said unit being free of metal-to-metal contact with said support member at all angles of inclination.

References Cited in the file of this patent

UNITED STATES PATENTS

| 1,173,538 | Roberts | Feb. 29, 1916 |
| 1,445,617 | Jehu | Feb. 13, 1923 |
| 1,533,209 | Radu | Apr. 14, 1925 |
| 2,368,727 | Robinson | Feb. 6, 1945 |

FOREIGN PATENTS

| 494,851 | Great Britain | Nov. 2, 1938 |